US010408129B1

United States Patent
Goto et al.

(10) Patent No.: US 10,408,129 B1
(45) Date of Patent: Sep. 10, 2019

(54) ROTOR-STATOR BLADE INTERFERENCE NOISE REDUCTION SYSTEM AND FLYING OBJECT

(71) Applicant: KABUSHIKI KAISHA TOSHIBA, Tokyo (JP)

(72) Inventors: Tatsuhiko Goto, Kawasaki Kanagawa (JP); Akihiko Enamito, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 47 days.

(21) Appl. No.: 16/112,510

(22) Filed: Aug. 24, 2018

(30) Foreign Application Priority Data

Mar. 20, 2018 (JP) .................................. 2018-52482

(51) Int. Cl.
*F02C 7/045* (2006.01)
*G10K 11/178* (2006.01)

(52) U.S. Cl.
CPC ........ *F02C 7/045* (2013.01); *G10K 11/17821* (2018.01); *G10K 11/17881* (2018.01); *F05D 2260/962* (2013.01); *G10K 2210/121* (2013.01); *G10K 2210/1281* (2013.01); *G10K 2210/32271* (2013.01)

(58) Field of Classification Search
None
See application file for complete search history.

(56) References Cited

U.S. PATENT DOCUMENTS 5,382,134 A 1/1995 Pla et al.
5,423,658 A * 6/1995 Pla .......................... F02C 7/045
                                                            415/118
(Continued)

FOREIGN PATENT DOCUMENTS

JP    H11-159406 A    6/1989
JP    H1-128000 U     8/1989
(Continued)

OTHER PUBLICATIONS

Y. Honda, et al., "Active Minimization of Blade Rotational Notice from an Axial Fan" Transactions of the Japan Society of Mechanical Engineers (Part C) vol. 59, No. 562, pp. 1830-1835 (1993).
(Continued)

*Primary Examiner* — Paul W Huber
(74) *Attorney, Agent, or Firm* — Finnegan, Henderson, Farabow, Garrett & Dunner, L.L.P.

(57) ABSTRACT

According to one embodiment, a rotor-stator blade interference noise reduction system includes a plurality of rotor blades rotating around a center axis, a plurality of stator blades facing the plurality of rotor blades and being equal in number to the plurality of rotor blades, a plurality of speakers installed approximately along a rotor blade plane defined by the plurality of rotor blades rotating and generating control sound, and an evaluation microphone, in which a distance from the evaluation microphone to one of the plurality of speakers, a distance from the evaluation microphone to another of the plurality of speakers, and a distance from the evaluation microphone to the center axis, are approximately equal.

16 Claims, 12 Drawing Sheets

(56) References Cited

U.S. PATENT DOCUMENTS

| | | | | |
|---|---|---|---|---|
| 5,448,645 A | * | 9/1995 | Guerci | G10K 11/178 381/71.14 |
| 5,478,199 A | | 12/1995 | Gliebe | |
| 5,515,444 A | | 5/1996 | Burdisso et al. | |
| 5,526,432 A | | 6/1996 | Denenberg | |
| 6,201,872 B1 | | 3/2001 | Hersh et al. | |
| 2003/0219132 A1 | * | 11/2003 | Sommerfeldt | G10K 11/178 381/71.14 |
| 2016/0379619 A1 | * | 12/2016 | Sugaya | G10K 11/178 381/71.2 |
| 2017/0274984 A1 | * | 9/2017 | Beckman | B64C 11/50 |
| 2018/0033421 A1 | * | 2/2018 | Yamagishi | B64C 39/024 |
| 2019/0088244 A1 | | 3/2019 | Goto et al. | |
| 2019/0106204 A1 | * | 4/2019 | Konishi | B64C 27/001 |
| 2019/0106205 A1 | * | 4/2019 | Konishi | B64C 27/001 |

FOREIGN PATENT DOCUMENTS

| | | |
|---|---|---|
| JP | H6-508695 A | 9/1994 |
| JP | H9-258745 A | 10/1997 |
| JP | H9-511810 A | 11/1997 |
| JP | H11-502032 A | 2/1999 |
| JP | 2003-233133 A | 8/2003 |
| JP | 2006-211770 A | 8/2006 |
| JP | 2009-103079 A | 5/2009 |
| JP | 2018-111461 A | 7/2018 |
| JP | 2019-53197 A | 4/2019 |
| WO | WO 93/02445 A1 | 2/1993 |

OTHER PUBLICATIONS

T. Aoki, et al., "Theoretical study on active control of rotational noise source using discrete ring sound source", Japan Acoustical Society Journal vol. 60, No. 11, pp. 639-645 (2004).

* cited by examiner

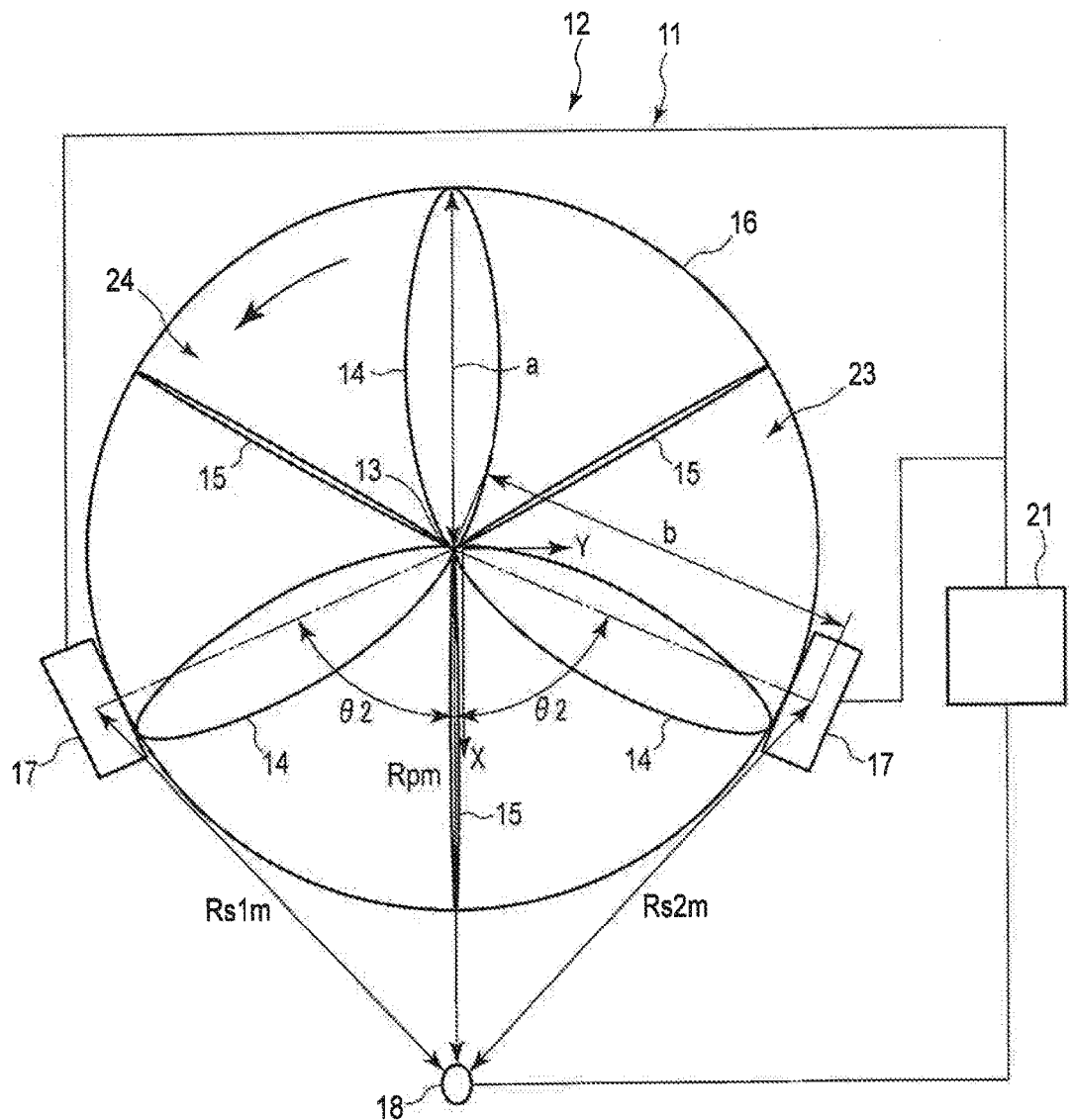
F I G. 2

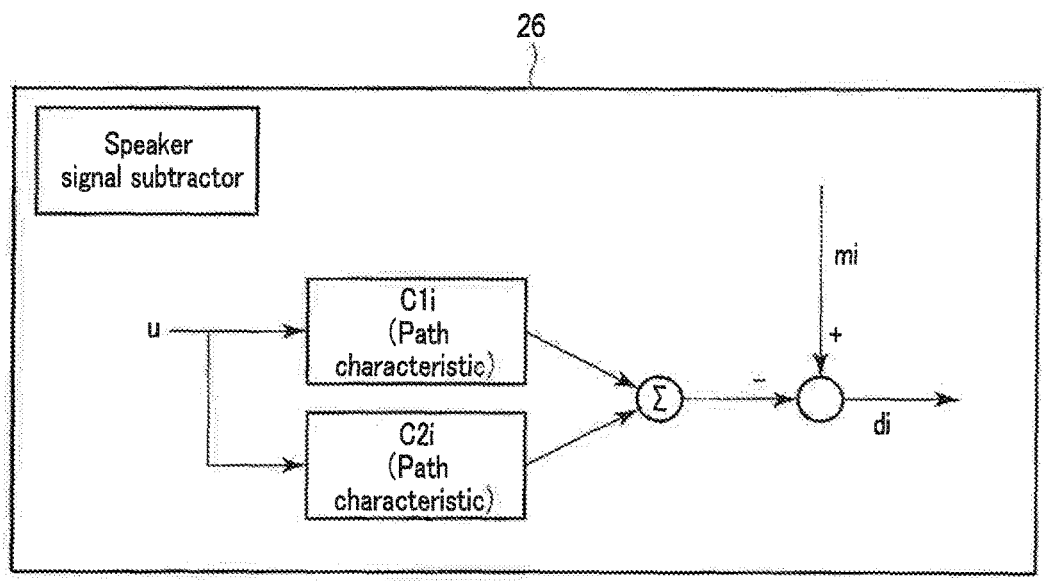
F I G. 13
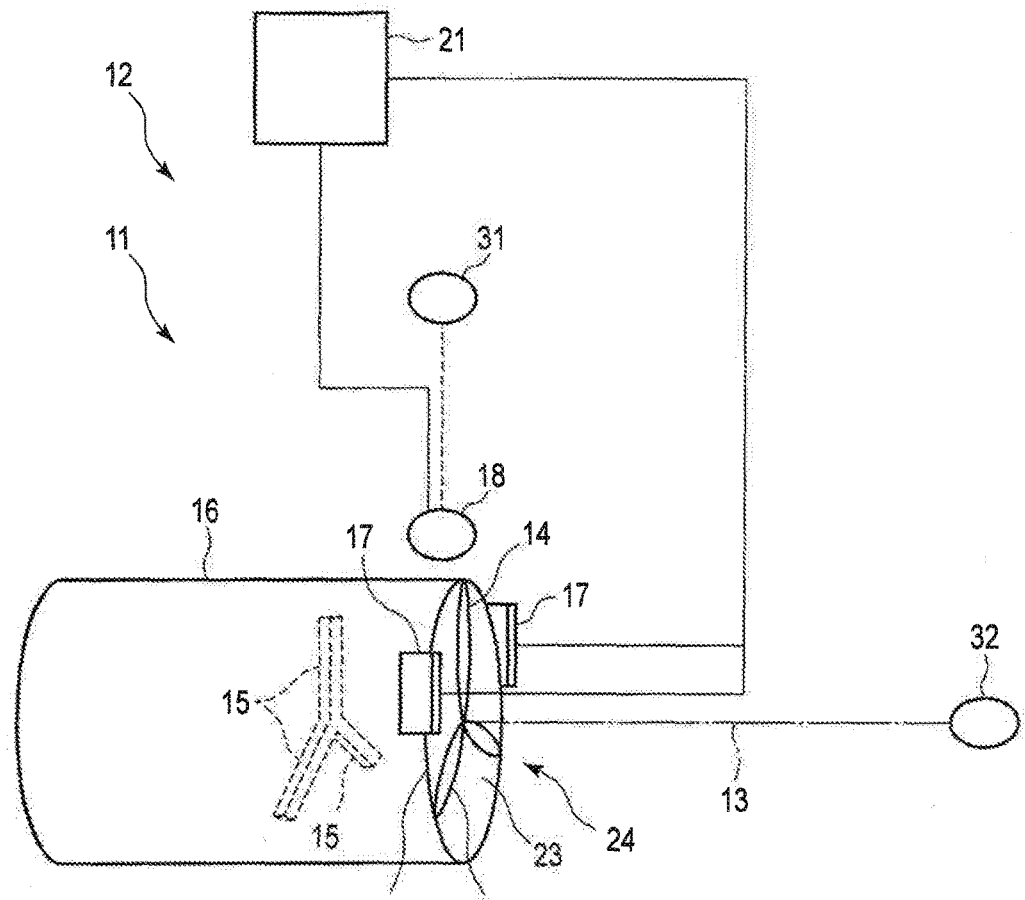
F I G. 14

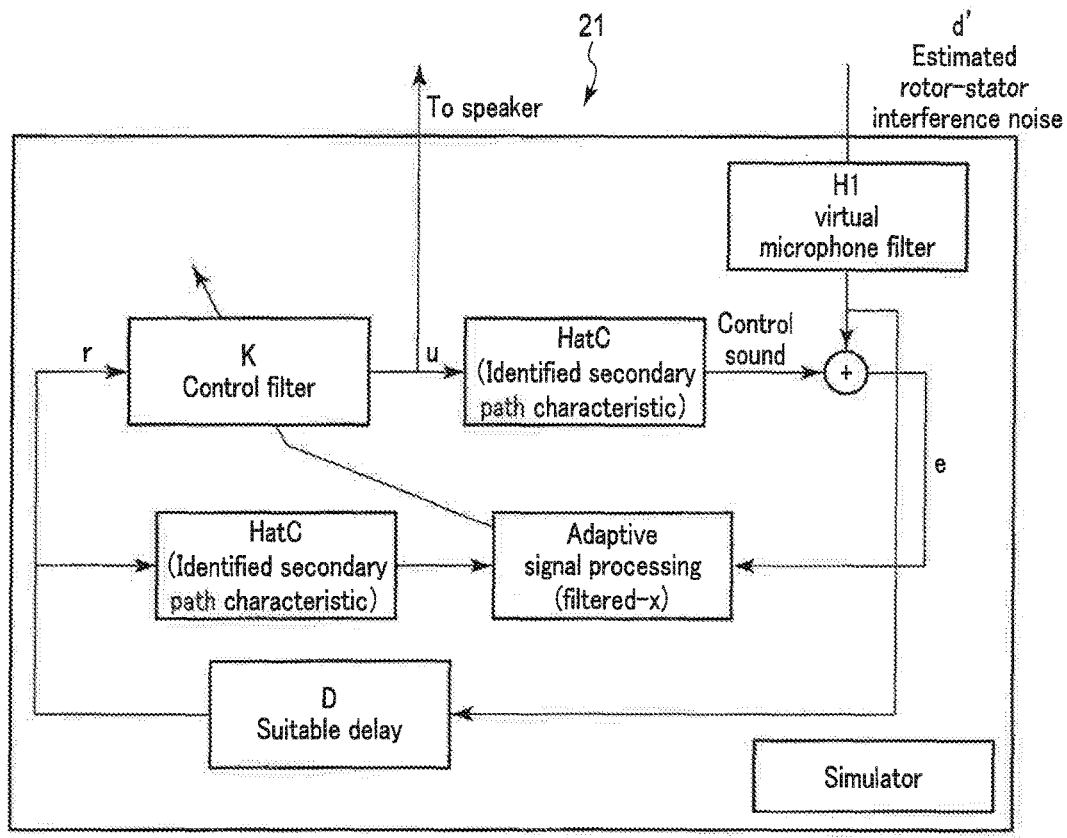
F I G. 15
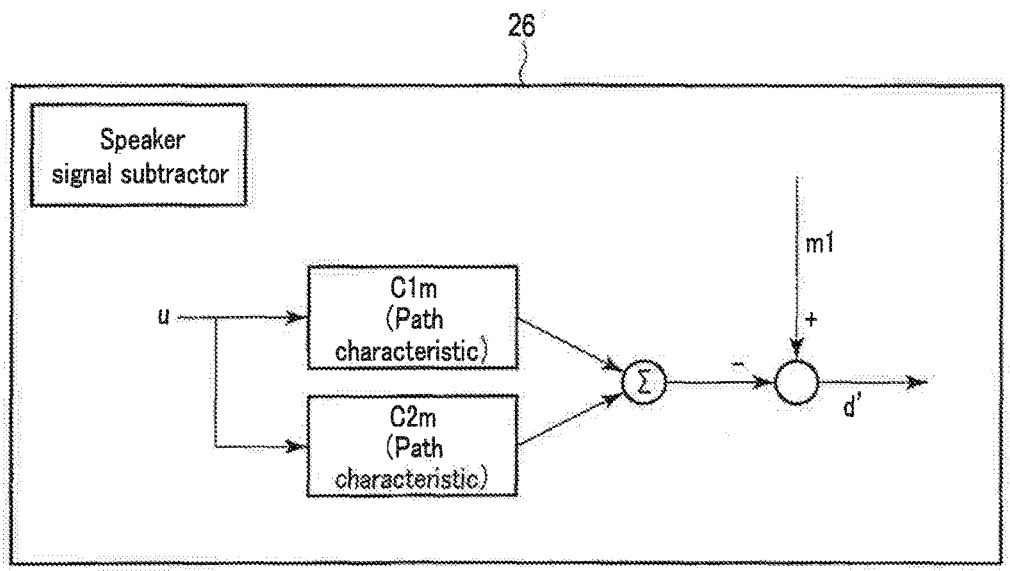
F I G. 16

ROTOR-STATOR BLADE INTERFERENCE NOISE REDUCTION SYSTEM AND FLYING OBJECT

CROSS-REFERENCE TO RELATED APPLICATIONS

This application is based upon and claims the benefit of priority from prior Japanese Patent Application No. 2018-052482, filed Mar. 20, 2018, the entire contents of which are incorporated herein by reference.

FIELD

Embodiments described herein relate generally to a rotor-stator blade interference noise reduction system capable of reducing rotor-stator blade interference noise.

BACKGROUND

Active sound cancellation control (active noise control, also referred to as "ANC") is known as active noise cancellation against a rotation sound source caused by interference of rotor blades and rotor-stator blades. ANC can reduce noise by outputting from a control speaker a signal (control sound) having the same amplitude as, and having an opposite phase to, the noise.

For an active noise canceling technique, there is a technique of arranging, on a circumference, a plurality of control speakers around a rotation sound source. However, this technique requires many control speakers to simulate the rotation sound source. An object is to provide a rotor-stator blade interference noise reduction system in which the number of speakers can be reduced.

BRIEF DESCRIPTION OF THE DRAWINGS

FIG. 2 is a front schematic view showing a rotor-stator blade interference noise reduction system according to a first embodiment (Example 1), including three rotor blades, three stator blades, two speakers, an evaluation microphone, and a controller;

FIG. 13 is a block diagram showing a control configuration, in which path characteristics are subtracted from a control signal u to calculate a signal of the control sound in speaker signal subtractors of the third embodiment;

FIG. 14 is a perspective view showing a rotor-stator blade interference noise reduction system according to a fourth embodiment, including rotor blades, stator blades, a duct, two speakers, an actual evaluation microphone, and a first virtual point and a second virtual point at virtual microphone positions;

FIG. 15 is a block diagram showing a simulator using a feedback-type ANC algorithm using filtered-x of the system according to the fourth embodiment; and FIG. 16 is a block diagram showing a control configuration, in which path characteristics are subtracted from the control signal u to calculate a signal d' of the rotor-stator blade interference noise in a speaker signal subtractor of the fourth embodiment.

DETAILED DESCRIPTION

According to one embodiment, a rotor-stator blade interference noise reduction system includes a plurality of rotor blades rotating around a center axis, a plurality of stator blades facing the plurality of rotor blades and being equal in number to the plurality of rotor blades, a plurality of speakers installed approximately along a rotor blade plane defined by the plurality of rotor blades rotating and generating control sound, and an evaluation microphone, in which a distance from the evaluation microphone to one of the plurality of speakers, a distance from the evaluation microphone to another of the plurality of speakers, and a distance from the evaluation microphone to the center axis, are approximately equal.

Figure 1:
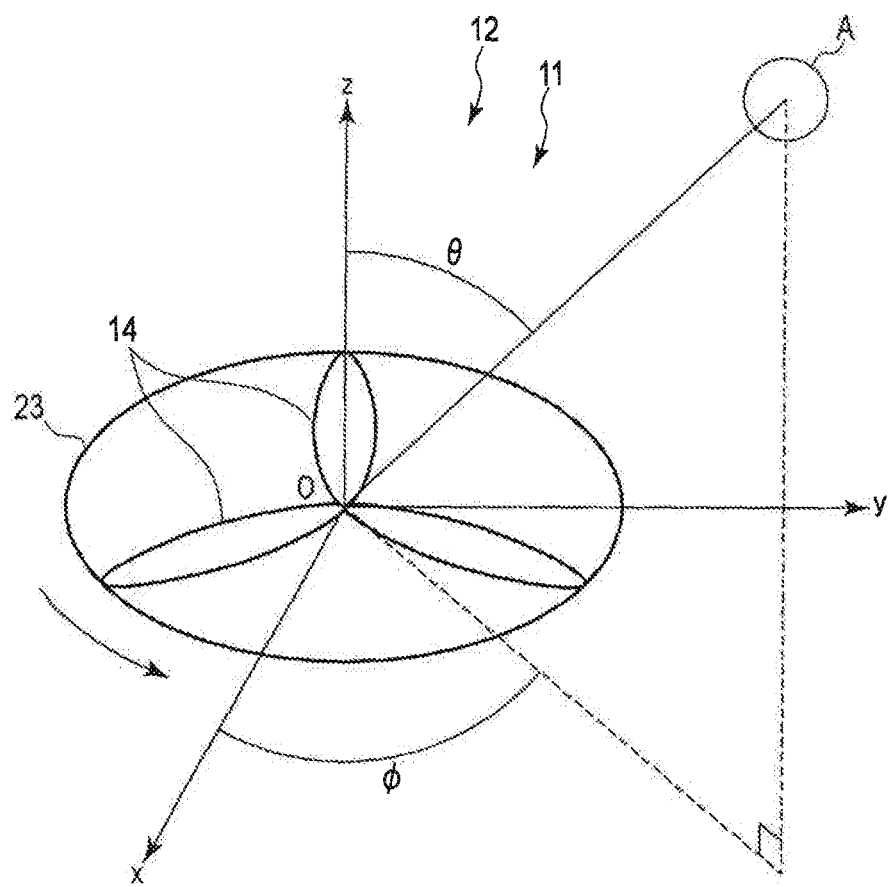
FIG. 1 is a view showing a three-dimensional polar coordinate system corresponding to each embodiment.

In the description below, a three-dimensional polar coordinate illustrated in FIG. 1 is used as a coordinate. In the three-dimensional polar coordinate of FIG. 1, a Z axis is set in a direction in which a rotation axis 13 (center axis) of rotor blades 14 extends, a plane on which the rotor blades 14 are provided is defined as an XY plane, an azimuth angle in the XY plane, i.e., an angle from an X axis is defined as an azimuth angle φ, and an angle of a target A (e.g., an evaluation microphone, etc.) from the Z axis is defined as an elevation angle θ. A rotor-stator blade interference noise reduction system 11 of the embodiment described below is installed, for example, at a vicinity of an axial-flow fan or propeller of a flying object 12.

First Embodiment

Figure 3:
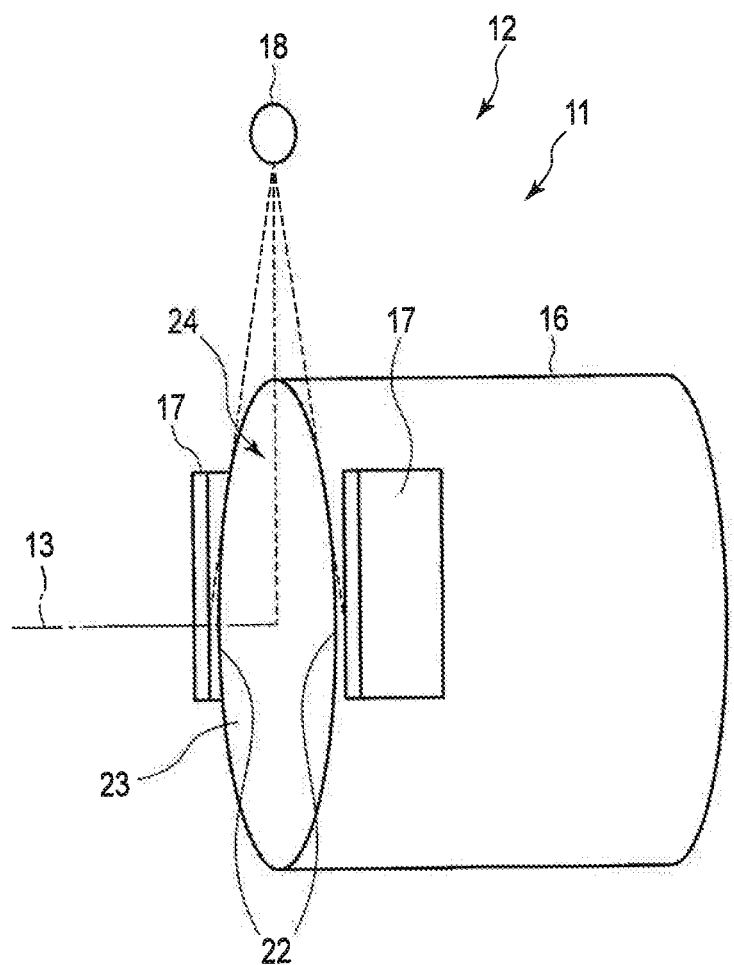
FIG. 3 is a perspective view showing the system according to the first embodiment (example 1)

As illustrated in FIGS. 2 and 3, the rotor-stator blade interference noise reduction system 11 according to the first embodiment is installed in, for example, the flying object 12. The flying object 12 is, for example, a drone. The flying object 12 may of course be a passenger airplane, a helicopter, or the like.

The rotor-stator blade interference noise reduction system 11 includes a center axis 13 (rotation axis), a plurality of rotor blades 14 rotating around the center axis 13, a plurality of stator blades 15 facing the plurality of rotor blades 14, a tubular (cylindrical) duct 16 surrounding the plurality of rotor blades 14 and the plurality of stator blades 15, two speakers 17, an evaluation microphone 18 acquiring noise generated from the plurality of rotor blades 14 and control sound generated from the plurality of speakers 17, and a controller 21 controlling the speakers 17. If the rotation axis to which the plurality of rotor blades 14 are attached is configured to have a rod shape having a large diameter, the center axis 13 is defined as an axis line passing through the center of its rotation axis. The plurality of rotor blades 14 are rotated and driven by, for example, a motor, to provide fluid to a desired direction. The plurality of stator blades 15 are attached to straighten exhaust flow generated by rotation of the rotor blades 14. The number of speakers 17 may be two or more, i.e., plural.

The duct 16 may be or may not be provided. The duct 16 includes at least one opening edge 22. Thus, the number of opening edges 22 provided in the duct 16 may be one or two.

A rotor blade plane 23 is defined by the rotor blades 14 rotating. The number of the plurality of rotor blades 14 is, for example, three. The number of the plurality of stator blades 15 is equal to that of the rotor blades 14 (e.g., three). The speakers 17 may be directly fixed to the outside of the duct 16, or may be provided at a position a predetermined distance away from the outer surface of the duct 16 through jigs or other attachment members. The controller 21 actives the two speakers 17 to generate control sound having the same phase and the same amplitude.

The speakers 17 and the evaluation microphone 18 are provided at a position approximately along the rotor blade plane 23. The position approximately along the rotor blade plane 23 refers to a position on the rotor blade plane 23, or a position slightly deviated from the rotor blade plane 23 toward the center axis 13 direction. In the present embodiment, the two speakers 17 and the evaluation microphone 18 are provided along the opening edge 22 at the suction port 24 side where fluid (air) is taken in. The speakers 17 and the evaluation microphone 18 of the rotor-stator blade interference noise reduction system 11 may be provided along an opening edge at a discharge port side where fluid (air) is discharged. The speakers 17 and the evaluation microphone 18 are connected to the controller 21.

An azimuth angle of the evaluation microphone 18 is set between an azimuth angle of one of the two speakers 17 and an azimuth angle of the other of the two speakers 17. The deviation amount 82 of each of the azimuth angles of the two speakers 17 with respect to the azimuth angle of the evaluation microphone 18 (installation angle θ2 of the speaker) is 60° or more and 85° or less, preferably 60° or more and 80 or less, more preferably 65° or more and 75° or less.

For example, if an X axis is defined on a line segment Rpm connecting the evaluation microphone 18 and the center axis 13, the azimuth angle of the evaluation microphone 18 is 0°. In this case, the installation angle θ2 of one of the two speakers 17 is +60° or more and +85° or less, preferably +60° or more and +80° or less, more preferably +65° or more and +75° or less. Similarly, the installation angle θ2 of the other of the two speakers 17 is −85° or more and −60° or less, preferably −80° or more and −60° or less, more preferably −75° or more and −65° or less.

The controller 21 is constituted by a general personal computer (PC). In the controller 21, the program of filtered-x, which is an ANC algorithm, is installed. It is assumed that the filtered-x, which is the ANC algorithm, is configured as shown in FIG. 4 and FIG. 5.

Figure 4:
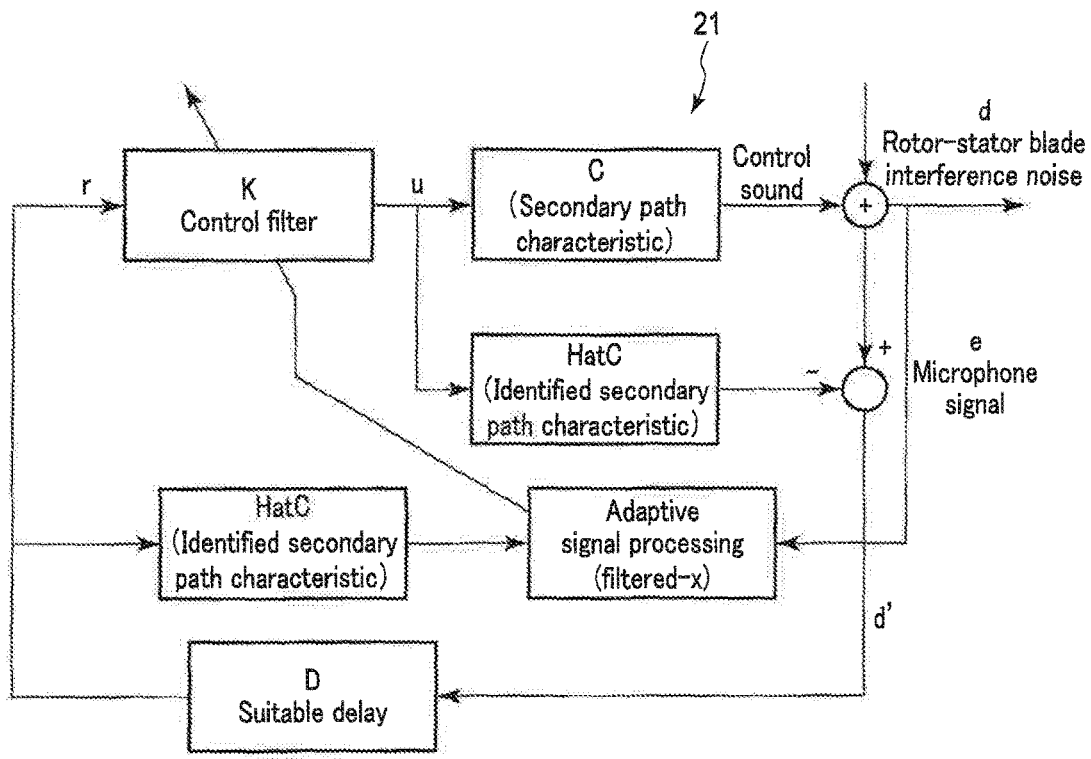
FIG. 4 is a block diagram showing a configuration of a feedback-type ANC algorithm using filtered-x of the system according to the first embodiment.

FIG. 4 illustrates a feedback type in which a reference signal r is internally generated, and a reference signal generator is unnecessary. The system configuration is simple and is suited to reduction of rotor-stator blade interference noise which is cyclic noise. Note that a secondary path C here is a transmission characteristic up to the evaluation microphone 18 at a time when a control input u (1 input) is input to each speaker 17 by the same signal. Thus, this configuration is a 1-input/1-output active sound cancellation system, and the calculation amount can be reduced, compared to a multi-channel ANC.

Figure 5:
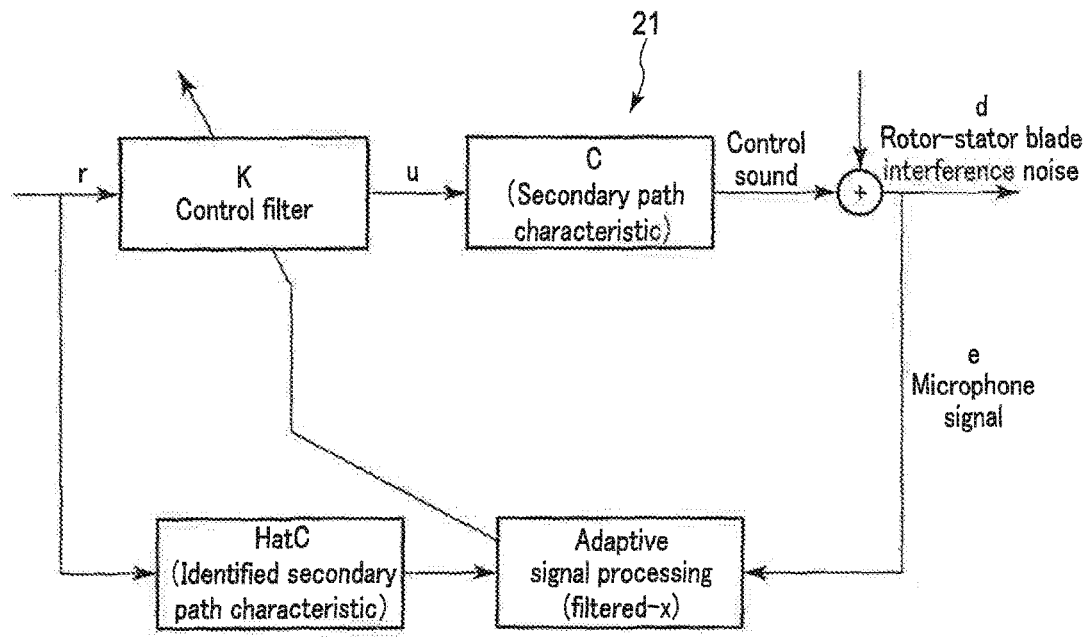
FIG. 5 is a block diagram showing a configuration of a feedforward-type ANC algorithm using filtered-x of the system according to the first embodiment.

FIG. 5 illustrates a feed-forward type. A rotor blade rotation angle is measured by a rotary encoder or the like, a rotor blade passage timing is measured by a laser pulse, a reference signal is generated, and active sound cancellation is implemented. Compared to the configuration of FIG. 4, there is an advantage that an exact reference signal can be obtained, but there is a problem that the configuration becomes larger.

Next, the effects of the present embodiment will be described.

The number of speakers 17 (control speakers) necessary to simulate a rotation sound source generated from the rotor blades 14 will be indicated below. According to publicly-known literature, it is known that the minimum number necessary to simulate a rotor blade rotation sound source by discrete control speakers 17 arranged on a circumference is $2M+1$ ($M=nB$). Here, B is the number of rotor blades 14, and n is a target noise order (positive integer). The number of speakers 17 is preferably $2M+3$ or more, to sufficiently suppress the influence of extra modes (aliasing modes) generated by discretization of the speakers 17. For example, in the case of two blades ($B=2$), according to the above equation, a reduction of the primary noise mode requires five to seven speakers 17, and a reduction of the secondary mode requires double the speakers, i.e., ten to fourteen speakers 17. The number of speakers 17 required increases as the number of blades increases, such as three or four blades.

Next, a description will be given for the number of speakers 17 required for a case where rotor-stator blade interference occurs in which noise is generated by interference of the rotor blades 14 and the stator blades 15. The rotor-stator blade interference sound is $M=nB+pV$, different from a spinning mode order M of the rotor blade 14 alone.

Here, V is the number of stator blades 15, and p is a discretionary constant (e.g., $p=\pm 1, \pm 2, \ldots$). Of spinning modes generated, it is known that a mode having a high noise contribution ratio is a low-order mode (e.g., $n=1$). Thus, if the minimum spinning mode is Mmin, the minimum number of control speakers 17 necessary to simulate the mode is $2\text{Mmin}+1$ (preferably $2\text{Mmin}+3$).

In the present embodiment, since the rotor blades 14 and the stator blades 15 are provided in the same number, $B=V$. Thus, Mmin=0, and the number of rotor and stator blades can be set in which spinning modes are not generated. Thereby, the rotor-stator blade interference sound is propagated as plane wave in the duct 16. Thus, in the duct 16, uniform wavefronts of the rotor-stator blade interference sound appear regardless of the azimuth angle φ. The minimum number of speakers necessary to reduce acoustic power of the plane wave is two. Applying the filtered-x algorithm which is an ANC algorithm, etc. allows great reduction of the plane wave of the rotor-stator blade interference sound transmitted in the duct 16.

Example 1

As illustrated in FIGS. 2 and 3, the number of the plurality of rotor blades 14 is, for example, three. The number of the stator blades 15 is equal to that of the rotor blades 14, and is three, for example. Each of the two speakers 17 is fixed to the outside of the duct 16 through a jig, etc.

In the present example, the positions of the speakers 17 and the evaluation microphone 18 are set so that a distance Rs1m from the evaluation microphone 18 to one of the two speakers 17, a distance Rs2m from the evaluation microphone 18 to the other of the two speakers 17, and a distance Rpm from the evaluation microphone 18 to the center axis 13, are equal.

Specifically, a length a of the rotor blade 14 (main sound source) is 0.23 m, the number of speakers 17 (the number of control sound sources) is two, and an installation angle of one of the two speakers 17 is defined as +θ2 while an installation angle of the other of the two speakers 17 is defined as −θ2, with respect to the line segment Rpm (X axis) connecting the evaluation microphone 18 and the center axis 13. The installation radius b of the speaker (distance b from the center axis 13 to the speaker 17) is as follows.

$$B=a*(1 \text{ to } 1.6)(m)$$

The target order of the reduction target of rotor-stator blade interference is one. The rotation velocity of the rotor blades 14 is 50 Hz.

Figure 6:
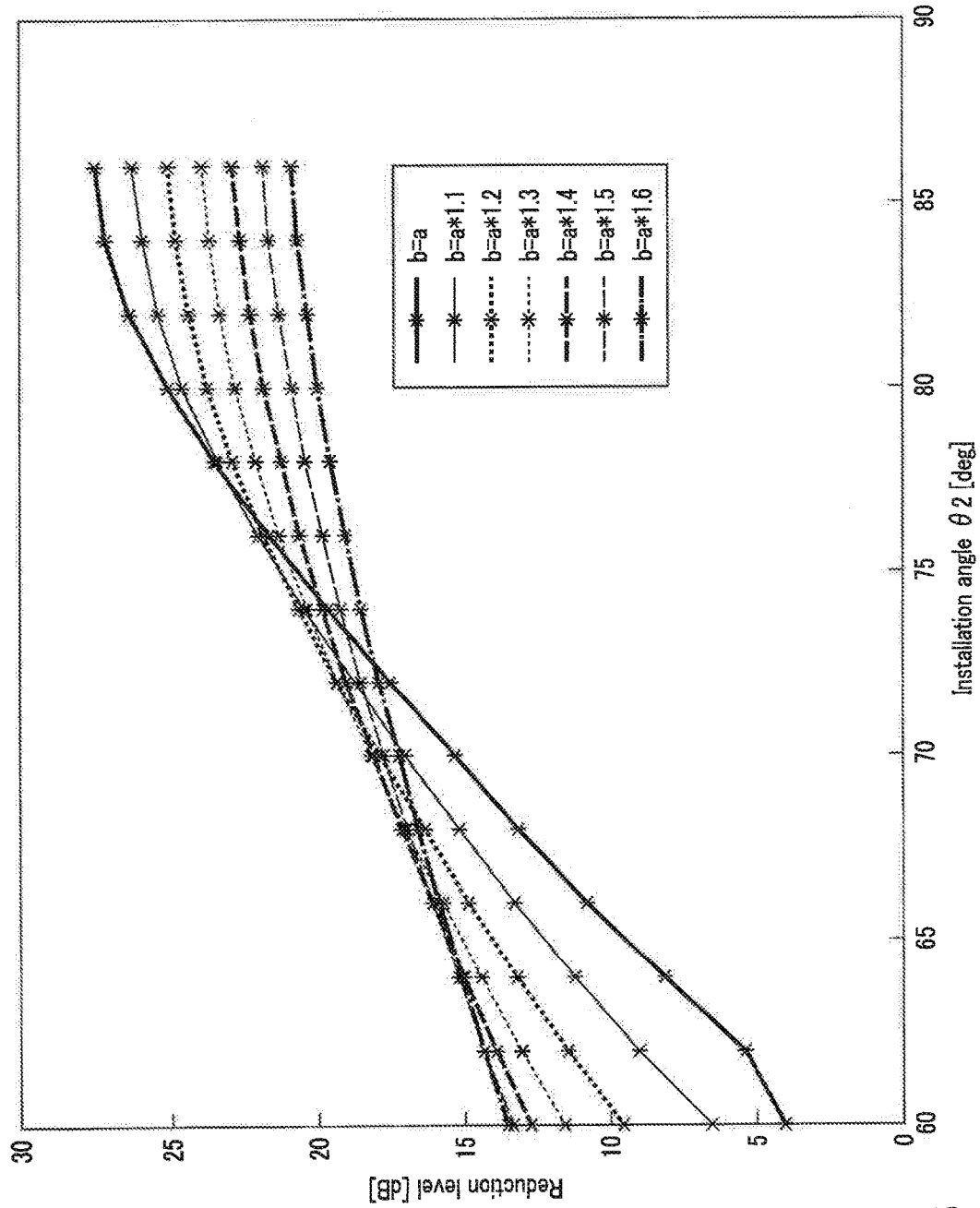
FIG. 6 is a graph showing the results of Example 1, and the relation among a length a of the rotator blade, an installation radius b of the speaker, and a reduction level of acoustic power of rotor-stator blade interference noise.

In the present example, the installation angle θ2 of the speaker 17 and the installation radius b of the speaker 17 were changed to compare control effects. The results are shown in FIG. 6.

According to the results, when the installation angle θ2 of the speaker 17 is small (70° or below in this example), the distance from the evaluation microphone 18 to the speaker 17 becomes small, and the evaluation microphone 18 is more influenced by the speaker 17 (it is a short-distance acoustic field). Thus, it is understood that if the installation radius b of the speaker 17 is longer and the installation distance of the evaluation microphone 18 is longer, the influence of the speakers 17 is reduced, and the control effect can be increased (reduction level of acoustic power can be increased). Moreover, if the installation angle θ2 of the speaker 17 is large (70° or more in this example), when a distance difference between the installation radius b of the speaker 17 and the length a of the rotor blades 14 is made small, the distance difference b-a becomes small, and the control effect increases. If the installation angle θ2 of the speaker 17 is larger, the distance Rpm from the center axis 13 to the evaluation microphone 18 becomes longer. Thus, it is desirable that designers set the installation angle θ2 as appropriate in accordance with a target reduction level of noise acoustic power.

In the following, a description will be given of an example of how the speakers 17 and the evaluation microphone 18 are installed. A target reduction level is set to 12 to 15 dB.

Installation Example 1

The installation radius b of the speaker 17 may be set to be approximately equal to the length a of the rotor blade 14, or the installation radius b of the speaker 17 may be set to be approximately equal to the radius of the duct 16. The radius b of the speaker 17 is set so that the speaker 17 is directly attachable to the duct 16. An azimuth angle of the evaluation microphone 18 is set between an azimuth angle of one of the two speakers 17 and an azimuth angle of the other of the two speakers 17. The deviation amount 82 of each of the azimuth angles of the two speakers 17 with respect to the azimuth angle of the evaluation microphone 18 (installation angle θ2 of the speakers) is 70° or more and 80° or less, preferably 70° or so. In this case, the distance from the center axis 13 to the evaluation microphone 18 does not become excessive beyond necessity. The number of speakers 17 may be two or more, i.e., plural, two of which may be installed as the above-described installation example.

Installation Example 2

The installation radius b of the speaker 17 is set at from 1.3 to 1.6 times the length a of the rotor blade 14, and the distance from the center axis 13 to the evaluation microphone 18 is set to be equal to the installation radius b of the speaker 17. The azimuth angle of the evaluation microphone 18 is set between an azimuth angle of one of the two speakers 17 and an azimuth angle of the other of the two speakers 17. In this case, the line connecting the center axis 13, each of the two speakers 17, and the evaluation microphone 18 form an approximately regular triangle. The two speakers 17 and the evaluation microphone 18 are arranged on the same circumference around the center axis 13. Thus, the deviation amount θ2 of each of the azimuth angles of the two speakers 17 with respect to the azimuth angle of the evaluation microphone 18 (installation angle θ2 of the speakers) is approximately 60°. The speakers 17 may be two or more, i.e., plural, two of which may be installed as the above-described installation example.

Unlike the Installation Example 1, the duct 16 of this Installation Example 2 requires jigs for installing the speakers and a jig for installing the evaluation microphone. However, because of the arrangement of the approximately regular triangle, the size of these jigs can be the same, and the installation jigs can be commonly used. This can reduce costs required for fixing the speakers 17 and the evaluation microphone 18.

According to the first embodiment and Example 1, the following can be said. The rotor-stator blade interference noise reduction system 11 includes: a plurality of rotor blades 14 rotating around a center axis 13; a plurality of stator blades 15 facing the plurality of rotor blades 14, and being equal in number to the plurality of rotor blades 14; two speakers 17 installed approximately along a rotor blade plane 23 defined by the plurality of rotor blades 14 rotating, and generating control sound; an evaluation microphone 18 installed approximately along the rotor blade plane 23, and acquiring noise generated from the plurality of rotor blades 14 and the control sound generated from the plurality of speakers 17; and a controller 21 controlling the two speakers 17 to cause the two speakers 17 to generate the control sound having a same phase and a same amplitude, in which a distance from the evaluation microphone 18 to one of the two speakers 17, a distance from the evaluation microphone 18 to another of the two speakers 17, and a distance from the evaluation microphone 18 to the center axis 13, are equal.

According this configuration, even if two speakers 17 are provided, it is possible to sufficiently reduce acoustic power of the entire space due to rotor-stator blade interference noise. Thus, the number of speakers 17 can be reduced, and it is possible to overcome the problem of a space required to install the speakers 17, the problem of costs required to install the speakers 17, and a problem of an increase in the total weight by the speakers 17. It is thus possible to realize the rotor-stator blade interference noise reduction system 11 that achieves lightweight, space saving, and cost reduction.

The rotor-stator blade interference noise reduction system 11 includes the tubular duct 16 surrounding the plurality of rotor blades 14 and the plurality of stator blades 15. The duct 16 includes at least one opening edge 22. The two speakers 17 and the evaluation microphone 18 are provided along the opening edge 22.

According to the configuration, even if the duct 16 is included, it is possible to sufficiently reduce acoustic power of the entire space due to rotor-stator blade interference noise.

The distance from the center axis 13 to each of the two speakers 17 is approximately equal to the length of one rotor blade 14 included in the plurality of rotor blades 14 or approximately equal to the radius of the duct 16. The azimuth angle of the evaluation microphone 18 is set between an azimuth angle of one of the two speakers 17 and an azimuth angle of the other of the two speakers 17. The deviation amount of each of the azimuth angles of the two speakers 17 with respect to the azimuth angle of the evaluation microphone 18 is 70° or more and 80° or less.

According to this configuration, the two speakers 17 and the evaluation microphone 18 can be directly fixed to the duct 16, and it is possible to easily fix and install them.

The distance from the center axis 13 to each of the two speakers 17 is set at from 1.3 to 1.6 times the length of one rotor blade 14 included in the plurality of rotor blades 14. The azimuth angle of the evaluation microphone 18 is set between an azimuth angle of one of the two speakers 17 and an azimuth angle of the other of the two speakers 17. The deviation amount of each of the azimuth angles of the two speakers 17 with respect to the azimuth angle of the evaluation microphone 18 is approximately 60°.

According to this configuration, the line connecting the center axis 13, the evaluation microphone 18, and the speaker 17 form an approximately regular triangle. Thus, the distance from the center axis 13 to the evaluation microphone 18 can be approximately equal to the distance from the center axis 13 to the speaker 17. Thus, fixtures (jigs) for fixing the evaluation microphone 18 and the speakers 17 can be commonly used, and the costs required for installing them can be reduced.

In the second, third, and fourth embodiments described below, mainly the parts different from those of the first embodiment and Example 1 will be explained, and illustrations or explanations of the parts identical to those will be omitted.

Second Embodiment

Figure 7:
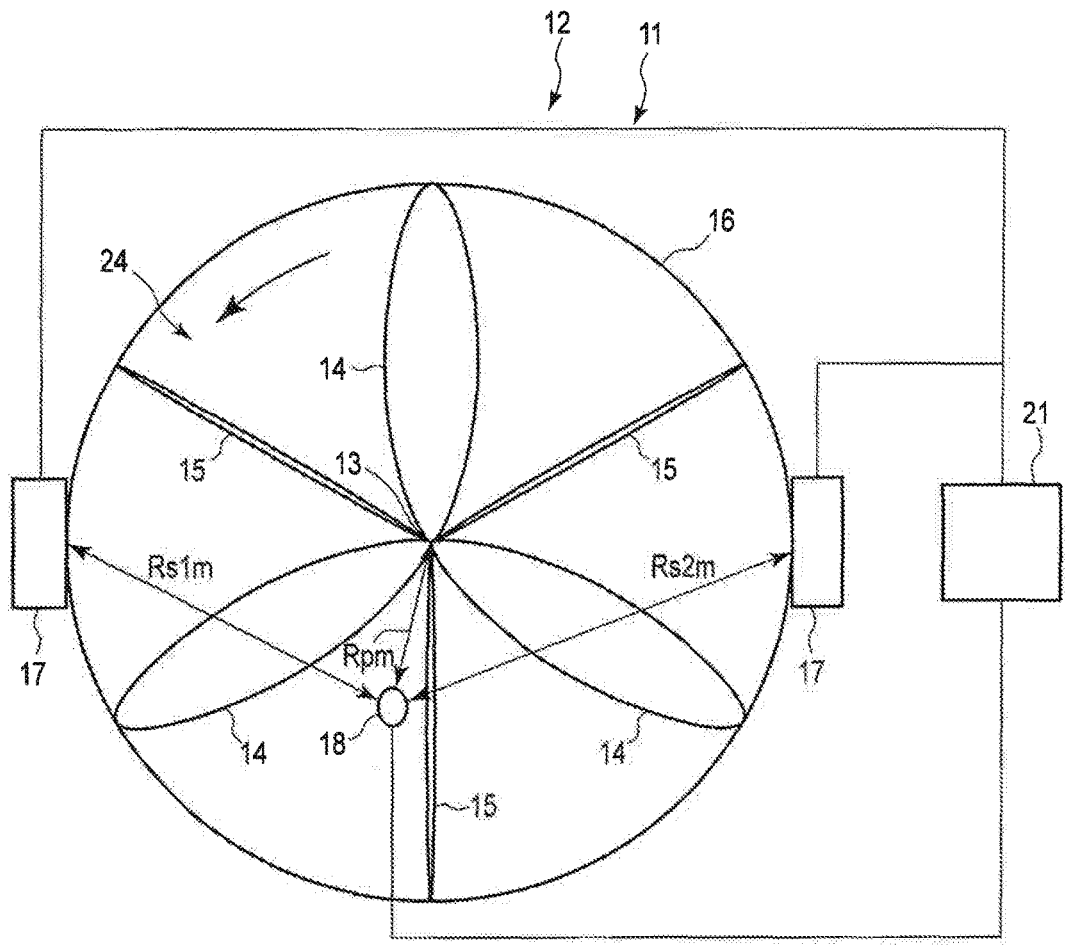
FIG. 7 is a front schematic view showing a rotor-stator blade interference noise reduction system according to a second embodiment (Example 2), including three rotor blades, three stator blades, two speakers, an evaluation microphone, and a controller.
Figure 8:
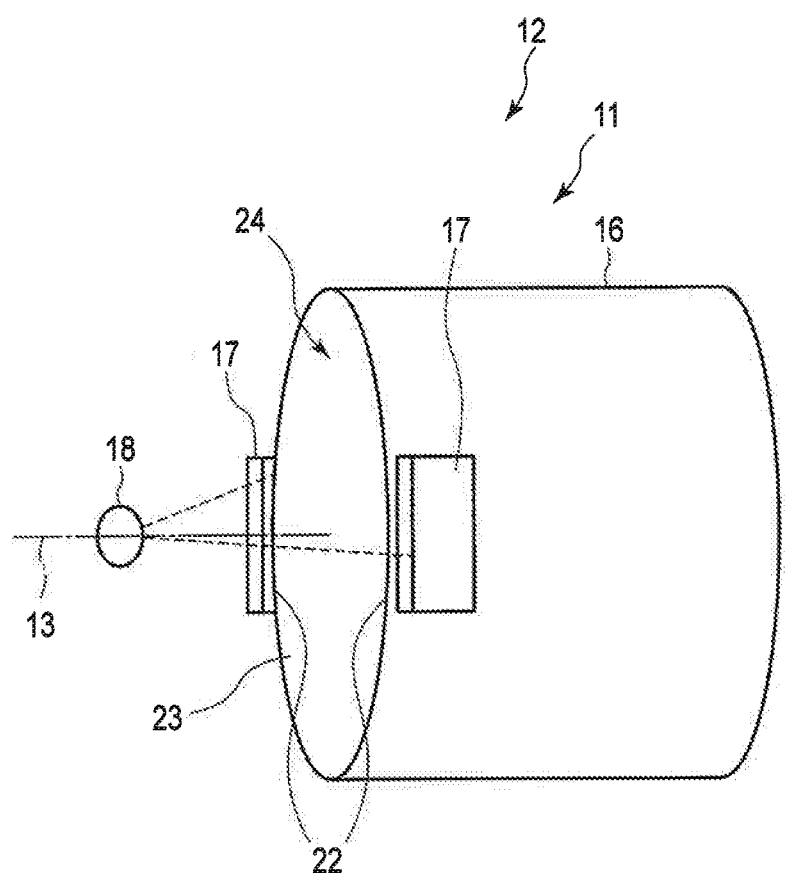
FIG. 8 is a perspective view showing the system according to the second embodiment (Example 2)

The second embodiment differs from the first embodiment in that the evaluation microphone 18 and the speakers 27 are arranged at different positions, but the other parts are the same. As illustrated in FIG. 7 and FIG. 8, a rotor-stator blade interference noise reduction system 11 according to the second embodiment is installed, for example, in a flying object 12.

The duct 16 may or may not be provided. The duct 16 includes at least one opening edge 22. One or two opening edges 22 may be provided in the duct 16.

The speakers 17 are provided approximately along the rotor blade plane 23. The evaluation microphone 18 is provided on the center axis 13 (or an extension of the center axis 13) at the suction port 24 side where fluid (air) is taken in. The two speakers 17 of the rotor-stator blade interference noise reduction system 11 of the present embodiment are provided along the opening edge 22 at the suction port 24 side where air is taken in. The speakers 17 may be provided along an opening edge 22 at a discharge port side where fluid (air) is discharged. In this case, the evaluation microphone 18 is provided on the center axis 13 (or an extension of the center axis) at the discharge port. The number of speakers 17 may be two or more, i.e., plural.

Example 2

As illustrated in FIG. 7 and FIG. 8, the number of the plurality of rotor blades 14 is, for example, three. The number of the stator blades 15 is equal to that of the rotor blades 14, and is three, for example. Each of the two speakers 17 is fixed to the outside of the duct 16 through a jig, etc.

In the present example, positions are set so that a distance Rpm from a point where the center axis 13 intersects with the rotor blade plane 23 to the evaluation microphone 18 is approximately equal to a distance $Rs1m$ from the evaluation microphone 18 to one of the two speakers 17. Similarly, positions are set so that a distance Rpm from a point where the center axis 13 intersects with the rotor blade plane 23 to the evaluation microphone 18 is approximately equal to a distance $Rs2m$ from the evaluation microphone 18 to the other of the two speakers 17. The azimuth angle of the other of the two speakers 17 is deviated by 180° with respect to the azimuth angle of one of the two speakers 17. Thus, the two speakers 17 are provided on both sides while the center axis 13 is put therebetween.

Specifically, the length a of the rotor blade 14 is 0.23 m, and the number of the speakers 17 (the number of control sound sources) is two. Relative to the line segment extending from the point where the center axis 13 intersects with the rotor blade plane 23 to the vertical direction lower side (when it is defined as an X axis), an installation angle of one of the two speakers 17 is +90° while an installation angle of the other of the two speakers 17 is −90°. In FIG. 7, the line segment overlaps one of the stator blades 15.

The installation radius b of the speaker 17 is b=a*(1 to 1.6). The target order of the rotor-stator blade interference reduction target is 1, and the rotation velocity of the rotor blade 14 is 50 Hz.

Figure 9:
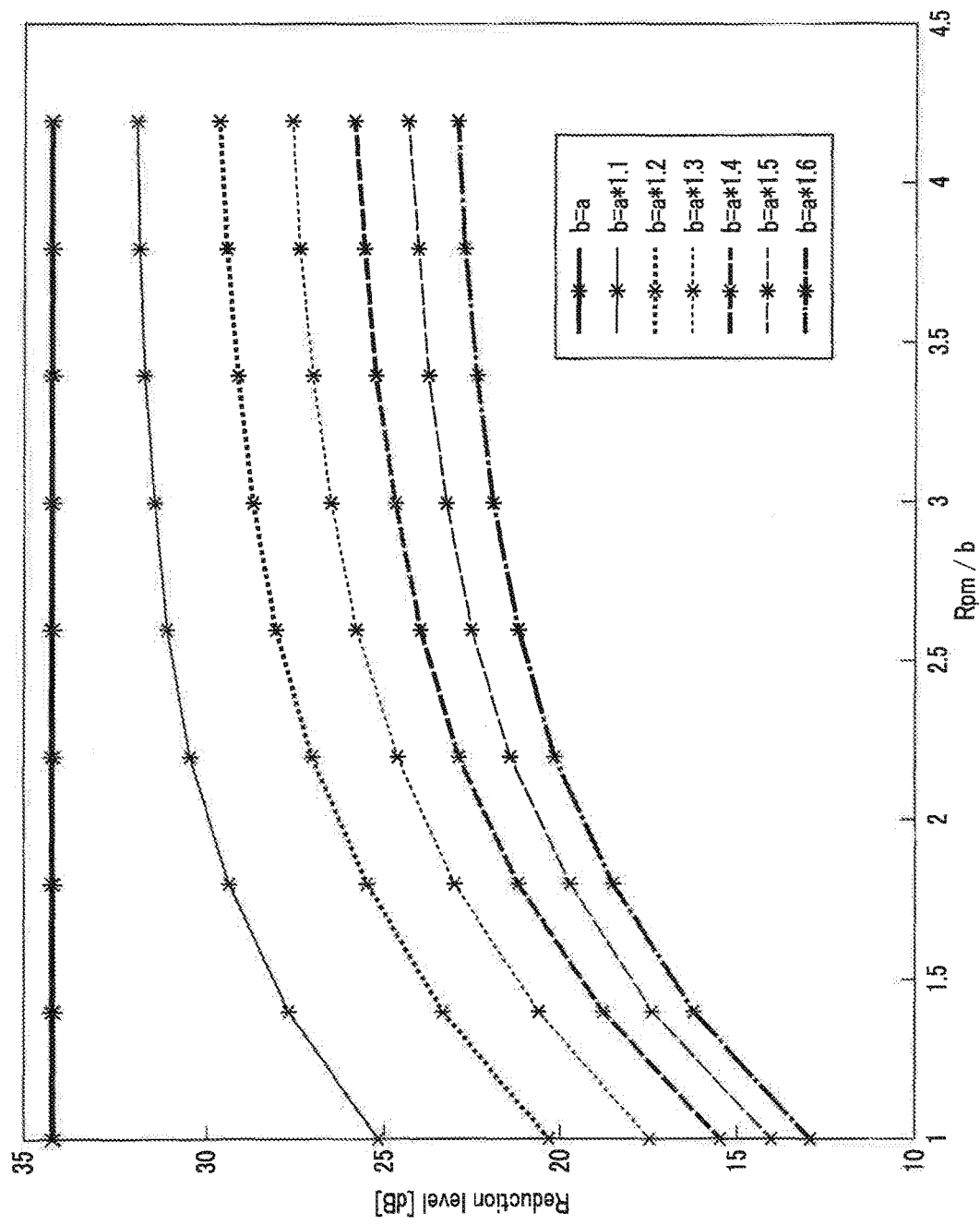
FIG. 9 is a graph showing the results of Example 2, and the relation among a distance Rpm from the point where the center axis intersects with the rotor blade plane to the evaluation microphone, an installation radius b of the speaker, and a reduction level of acoustic power of rotor-stator blade interference noise.

In the present example, the length of the distance Rpm from the evaluation microphone 18 to the center axis 13 was changed to compare control effects (reduction levels of acoustic power). The results are shown in FIG. 9. According to the results of FIG. 9, it is understood that the control effect increases as the distance Rpm from the evaluation microphone 18 to the center axis 13 increases. This is because it becomes closer to the relationship $Rs1m$=$Rs2m$=Rpm. However, if the distance Rpm from the evaluation microphone 18 to the center axis 13 is too long with respect to the installation radius b of the speaker 17, it becomes difficult to install the evaluation microphone 18 in an actual flying object 12. Thus, designers set the distance Rpm from the evaluation microphone 18 to the center axis 13 in accordance with a noise acoustic power reduction level that the designers set by themselves.

According to the second embodiment and Example 2, the following can be said. The rotor-stator blade interference noise reduction system 11 includes: a plurality of rotor blades 14 rotating around a center axis 13; a plurality of stator blades 15 facing the plurality of rotor blades 14, and being equal in number to the plurality of rotor blades 14; two speakers 17 installed approximately along a rotor blade plane 23 defined by the plurality of rotor blades 14 rotating, and generating control sound; an evaluation microphone 18 installed on the center axis 13, and acquiring noise generated from the plurality of rotor blades 14 and the control sound generated from the plurality of speakers 17; and a controller 21 controlling the two speakers 17 to cause the two speakers 17 to generate the control sound having a same phase and a same amplitude. A distance from a point where the center axis 13 intersects with the rotor blade plane 23 to the evaluation microphone 18 is approximately equal to a distance from the evaluation microphone 18 to one of the two speakers 17, and is approximately equal to a distance from the evaluation microphone 18 to the other of the two speakers 17.

According this configuration, even if two speakers 17 are provided, it is possible to sufficiently reduce acoustic power of the entire space due to rotor-stator blade interference noise. Thus, it is possible to reduce the number of the speakers 17, and it is possible to overcome the problem of a space required for installing the speakers 17, the problem of costs required for installing the speakers 17, and a problem of an increase in the total weight due to the speakers 17. It is thus possible to realize the rotor-stator blade interference noise reduction system 11 that achieves lightweight, space saving, and cost reduction.

Third Embodiment

The present embodiment differs from the first embodiment in that the number of evaluation microphones 18 is plural, but the other parts are the same. A rotor-stator blade interference noise reduction system 11 according to the third embodiment is installed in, for example, the flying object 12.

In the first and second embodiments, there is only one evaluation microphone 18 provided. However, in an environment where the influence of reflection is large, acoustic power by noise of the entire space may not be successfully reduced. Thus, the present embodiment sets a plurality of evaluation microphones 18 to have a so-called ring microphone shape so as to realize a rotor-stator blade interference noise reduction system 11 capable of efficiently reducing acoustic power in an environment where the influence of reflection is large. Like the first embodiment, the rotor-stator blade interference noise reduction system 11 according to the third embodiment is installed in, for example, the flying object 12.

Figure 10:
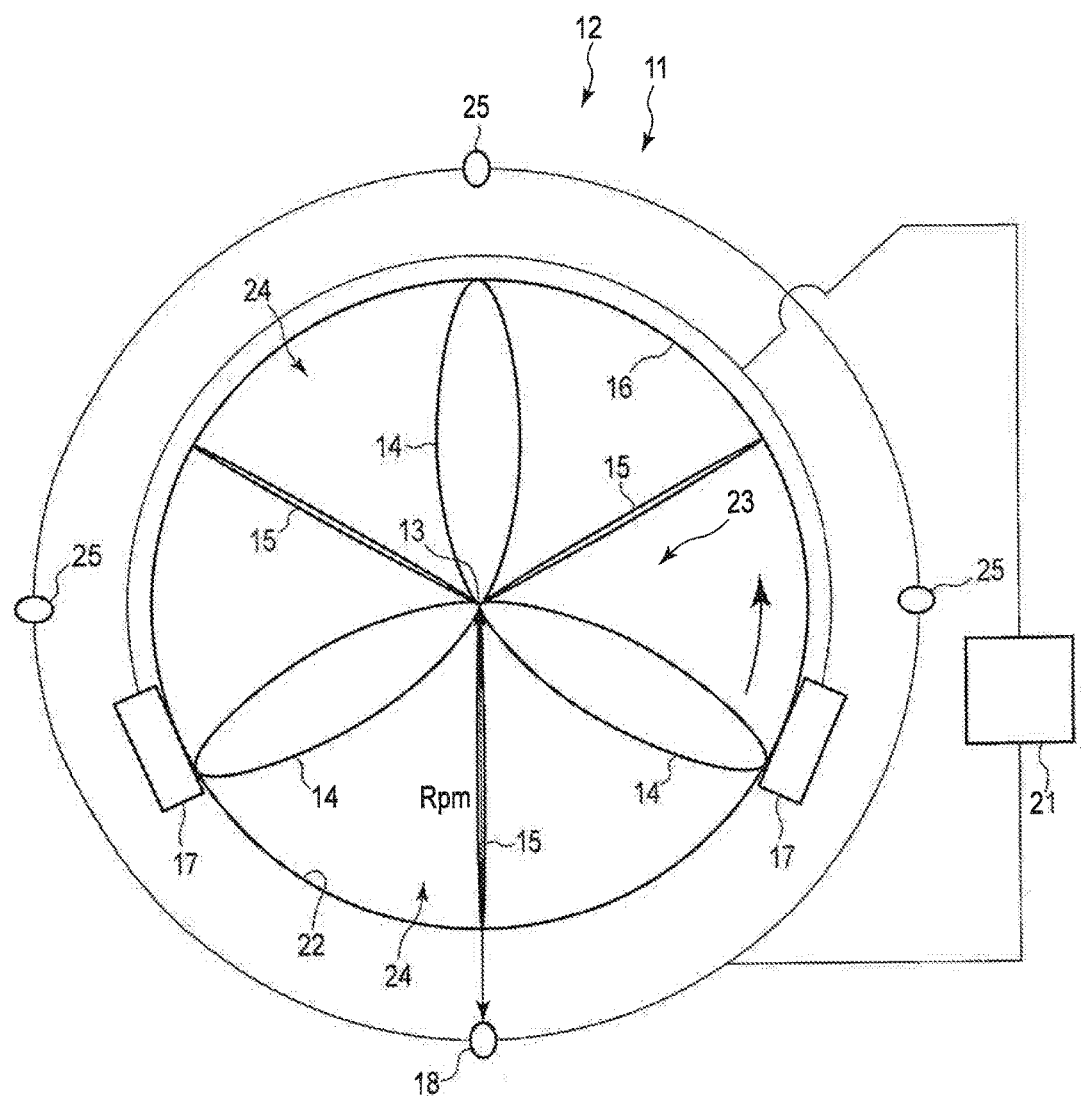
FIG. 10 is a front schematic view showing a rotor-stator blade interference noise reduction system according to a third embodiment (Example 3), including three rotor blades, three stator blades, two speakers, an evaluation microphone, and a controller.

As illustrated in FIG. 10, the rotor-stator blade interference noise reduction system 11 includes a center axis 13 (rotation axis), a plurality of rotor blades 14 rotating around the center axis 13, a plurality of stator blades 15 facing the plurality of rotor blades 14, a tubular (cylindrical) duct 16 surrounding the plurality of rotor blades 14 and the plurality of stator blades 15, two speakers 17, an evaluation microphone 18 acquiring noise generated from the plurality of rotor blades 14 and control sound generated from the plurality of speakers 17, a plurality of second evaluation microphones 25 acquiring noise generated from the plurality of rotor blades 14 and control sound generated from the plurality of speakers 17, and a controller 21 controlling the speakers 17.

The number of the plurality of rotor blades 14 is, for example, three. The number of the stator blades 15 is equal to that of the rotor blades 14, and is three, for example. Each of the two speakers 17 is fixed to the outer surface of the duct 16 by a jig, etc.

The speakers 17, the evaluation microphone 18, and the second evaluation microphones 25 are provided at a position approximately along the rotor blade plane 23. The two speakers 17, the evaluation microphone 18, and the second evaluation microphones 25 of the rotor-stator blade interference noise reduction system 11 of the present embodiment are provided along the opening edge 22 at the suction port 24 side where fluid (air) is taken in. The speakers 17, the evaluation microphone 18, and the second evaluation microphones 25 of the rotor-stator blade interference noise reduction system 11 may be provided along an opening edge at a discharge port side where fluid (air) is discharged. The speakers 17, the evaluation microphone 18, and the second evaluation microphones 25 are connected to the controller 21. The number of speakers 17 may be two or more, i.e., plural.

The plurality of second evaluation microphones 25 are discretely arranged on the circumference around the center axis 13 at a position approximately along the rotor blade plane 23. The circumference on which the plurality of second evaluation microphones 25 are arranged has a radius equal to the distance Rpm from the evaluation microphone 18 to the center axis 13. Thus, on this circumference, the evaluation microphone 18 and the plurality of second evaluation microphones 25 are arranged in a discrete manner. Thus, in the present embodiment, the evaluation microphone 18 forms a group of ring microphones with the second evaluation microphones 25. An interval between the microphones (evaluation microphone 18, second evaluation microphones 25) is uniform or approximately uniform. The evaluation microphone 18, the plurality of second evaluation microphones 25, and the speakers 17 are connected to the controller 21. In the present embodiment, an input having the same phase and the same amplitude is made from the dominant wave (plane wave) of the rotator-stator blade interference sound to each of the microphones (evaluation microphone 18, second evaluation microphones 25).

Here, the signal of the control sound used for subtraction can be easily calculated by identifying, in advance, the transmission characteristics from the speakers 17 to the microphones (evaluation microphone 18, second evaluation microphones 25).

In the present embodiment, since the number of the rotor blades 14 is equal to that of the stator blades 15, a contribution ratio of the spinning mode is low. For this reason, in the present embodiment, noise of the plane wave mode is acquired by each of the microphones. When noise of the plane wave mode is acquired, the signals of the plurality of microphones (evaluation microphone 18, second evaluation microphones 25) arranged to have a ring shape are summed (in-phase summed) to acquire the dominant wave of the rotor-stator blade interference sound, i.e., the acoustic wave other than the reflection wave. Thus, by subtracting, from each microphone signal, the control sound from each of the speakers 17 and summing the subtracted microphone signals, the dominant wave (referred to as d*) of the rotor-stator blade interference sound can be calculated. Accordingly, even when some microphones (evaluation microphone 18, second evaluation microphones 25) acquire a reflection wave or a nearby acoustic field of control sound generated from the speakers 17, it is possible to eliminate the influence by the nearby acoustic field.

Figure 12:
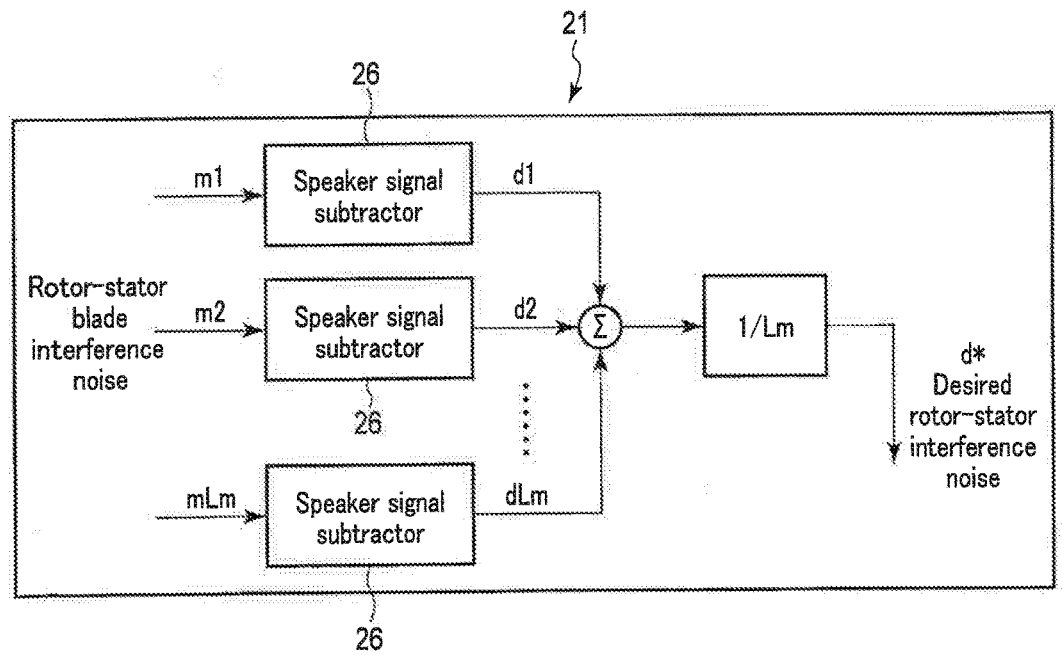
FIG. 12 is a block diagram showing a control configuration, in which a signal of control sound of the speakers is subtracted from a signal of the evaluation microphone and signals of the second evaluation microphones in speaker signal subtractors to obtain rotor-stator blade interference noise d1 to dLm, and a signal d* of the rotor-stator blade interference noise is extracted from the average thereof.

In other words, as illustrated in FIG. 12, the controller 21 subtracts, from a signal m1 of the evaluation microphone 18, the signal of control sound output from each of the speakers 17, to thereby acquire a first signal. Similarly, the controller 21 subtracts, from signals m2 to mLm of the plurality of second evaluation microphones 25, the signal of control sound output from each of the speakers 17, to thereby acquire a plurality of second signals. The controller 21 sums the subtracted microphone signals (first signal, second signals) d1 to dLm, and averages the sum (processing of 1/Lm, i.e., the sum is divided by the total number of the evaluation microphone 18 and the plurality of second evaluation microphones 25), to thereby calculate the dominant wave d* of the rotor-stator blade interference sound.

The signal of the control sound used for subtraction can be easily calculated from the control signal u that is input into the speakers 17 by identifying, in advance, the transmission characteristics (path characteristics) from the speakers 17 to the microphones (evaluation microphone 18, second evaluation microphones 25). Calculation of the signal of the control sound is performed in each of speaker signal subtractors 26 illustrated in FIG. 13. As illustrated in FIG. 13, the signal of the control sound is obtained by subtracting, from the control input u, the transmission characteristics (path characteristics) from the speaker 17 to each of the microphones in each of the speaker signal subtractors 26. The speaker signal subtractors 26 are realized by, for example, various circuit elements such as a low-pass filter, high-pass filter, bandpass filter, etc., a combination thereof, or a digital filter by DSP and FPGA.

Figure 11:
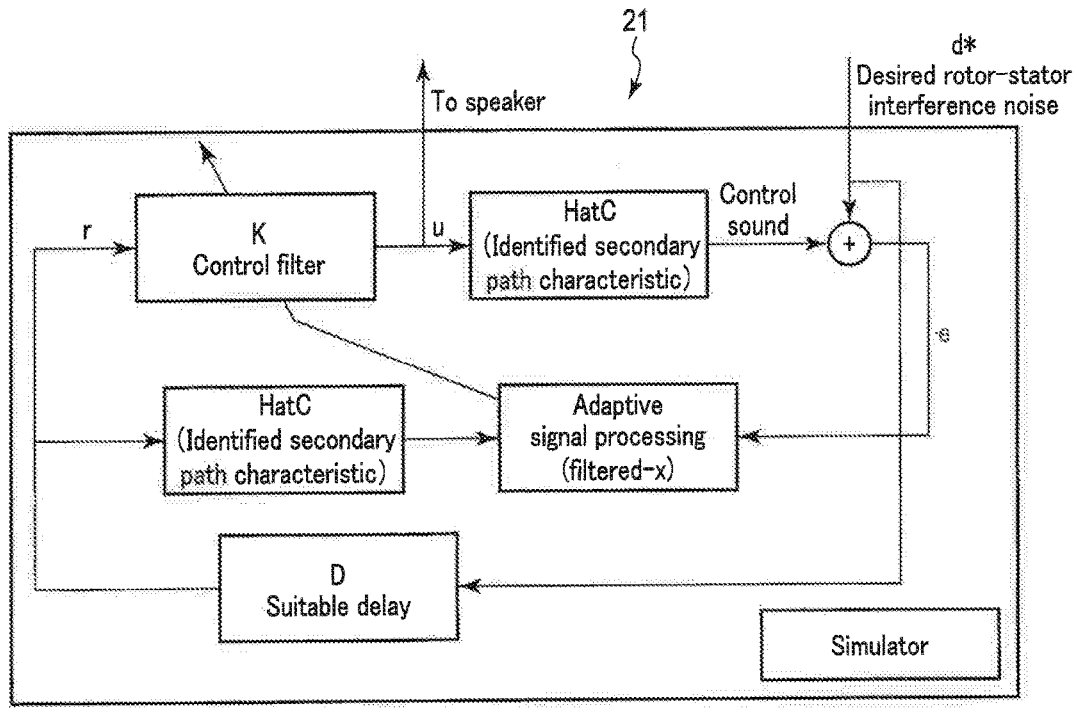
FIG. 11 is a block diagram showing a simulator using a feedback-type ANC algorithm using filtered-x of the system according to the third embodiment.

Next, a control algorithm of present embodiment will be described. FIG. 11 shows a control configuration of filtered-x which is an ANC algorithm of the present embodiment installed in the controller 21. The inventors found the problem that in the acoustic field where environmental reflection occurs, the influence of reflection accumulates at the time of identifying the transmission characteristics (secondary path) from the speakers 17 to the microphones (evaluation microphone 18, second evaluation microphones 25). Thus, it was confirmed that the control effect of the entire space, i.e., the acoustic power reduction effect, cannot be achieved when control is executed using secondary path characteristics identified in a state where environmental reflection occurs.

The inventors found, as a result of diligent research efforts, that it is better to identify secondary path characteristic HatC in an environment where the influence of reflection is small, like an anechoic room, while geometric arrangement of the speakers 17 and the microphones (evaluation microphone 18, second evaluation microphones 25) are maintained. Thereby, it is possible to eliminate the influence of environmental reflection. Alternatively, instead of using an anechoic room, the inventors found the technique of obtaining transmission characteristics from each of the speakers 17 to the representative microphone by numerical operations, assuming that the speakers 17 are point sound sources.

The inventors constructed an adaptive feedback-type simulator shown in FIG. 11 by a dominant wave (d) of rotor-stator blade interference sound, secondary path characteristic HatC, etc. (an error signal is generated inside the simulator). The simulator adaptively updates the control filter to provide an output of the control filter to each speaker. By the above method, it is possible to achieve reduction in noise of the entire space under reflective environments.

According to the present embodiment, the following can be said. The system includes a plurality of second evaluation microphones 25 acquiring noise generated from the plurality of rotor blades 14, and the control sound generated from the plurality of speakers 17, in which the plurality of second microphones 25 are arranged on a circumference around the center axis 13 at a position approximately along the rotor blade plane 23, the circumference includes a radius equal to a distance from the evaluation microphone 18 to the center axis 13, the controller 21 is configured to: subtract, from a signal output from the evaluation microphone 18, a signal corresponding to the control sound from the two speakers 17 to obtain a first signal; subtract, from signals output from the plurality of second evaluation microphones 25, the signal corresponding to the control sound from the two speakers 17 to obtain a plurality of second signals; and sum the first signal and the plurality of second signals, and divide the summed signals by the total number of the evaluation microphone 18 and the plurality of second evaluation microphones 25 to obtain an average signal.

According to this configuration, since the evaluation microphone 18 and the plurality of second evaluation microphones 25 are provided, it is possible to realize efficient suppression of noise in an environment where the influence of reflection is large. Furthermore, in each of the microphones (evaluation microphone 18, second evaluation microphones 25), it is possible to acquire a dominant wave of noise by removing parts corresponding to the signal of the control sound. Thus, even when the evaluation microphone 18 and the second evaluation microphones 25 acquire a reflection wave or a nearby acoustic field from the speakers 17, it is possible to eliminate the influence of the nearby acoustic field to achieve efficient noise suppression.

Fourth Embodiment

The present embodiment differs from the first embodiment (Example 1) and the second embodiment (Example 2) in that control is performed using a virtual microphone system. Like the first embodiment, a rotor-stator blade interference noise reduction system 11 according to the fourth embodiment is installed in, for example, the flying object 12. The number of speakers 17 may be two or more, i.e., plural.

In the first embodiment (Example 1) and the second embodiment (Example 2), there is a case where the position of the evaluation microphone 18 is too far away from the rotor blades 14, depending on the installation angles of the speakers 17, etc. Thus, there is a case where it is difficult to install an evaluation microphone 18 in a distant place when it is attached to the duct 16, etc. The present embodiment solves this problem by the controller 21 performing control using a virtual microphone system.

The virtual microphone system is known as an active noise canceling technique. In the virtual microphone system, designers measure, in advance, transmission characteristic H between the evaluation microphone 18 and a position where the evaluation microphone 18 is desired to be installed. The signal acquired by the evaluation microphone 18 is forwarded to the transmission characteristic H to virtually calculate a signal value at the desired installation position.

More specifically, during the driving of the rotor blades 14, transmission characteristic H1 of the rotor-stator blade interference sound is identified in a state in which no control sound is output from the speakers 17. The transmission characteristic H1 is transmission characteristic from the position where the evaluation microphone 18 is actually installed to the position where the evaluation microphone 18 is desired to be installed (virtual microphone position).

Furthermore, transmission characteristic HatC from the speaker 17 to the virtual microphone position is identified.

At this time, as illustrated in FIG. 14, the virtual microphone position virtually set by the controller 21 may be regarded as being at a first virtual point 31, which is the position approximately along the rotor blade plane 23 according the first embodiment. In this case, a distance Rs1m from the first virtual point 31 to one of the two speakers 17, a distance Rs2m from the first virtual point 31 to the other of the two speakers 17, and a distance Rpm from the first virtual point 31 to the center axis, may be set to be equal (the dimensional relation of Rs1m, Rs2m and Rpm is equivalent to that illustrated in FIG. 2 except the evaluation microphone 18 is replaced with the first virtual point 31).

Alternatively, as illustrated in FIG. 14, the virtual microphone position virtually set by the controller 21 may be regarded as being at a second virtual point 32 on the center axis 13 (or an extension of the center axis 13) according to the second embodiment. In this case, the distance Rpm from the point where the center axis 13 intersects with the rotor blade plane 23 to the second virtual point 32 may be set to be approximately equal to the distance Rs1m from the second virtual point 32 to one of the two speakers 17, and approximately equal to the distance Rs2m from the second virtual point 32 to the other of the two speakers 17 (the dimensional relation of Rs1m, Rs2m and Rpm is equivalent to that illustrated in FIG. 7 except that the evaluation microphone 18 is replaced with the second virtual point 32).

Using the transmission characteristics H1 and HatC identified in the aforementioned manner, the adaptive feedback control system as illustrated in FIG. 15 is configured. On the other hand, from the microphone signal m1 by the rotor-stator blade interference noise, the control sound from the speaker 17 is subtracted in the speaker signal subtractor 26. The subtracted microphone signal is referred to as d'. The adaptive feedback control system illustrated in FIG. 15 is different from the adaptive feedback control system illustrated in FIG. 11 of the third embodiment in that a virtual microphone filter H1 is added.

As illustrated in FIG. 16, the signal of the control sound used for subtraction can be easily calculated from the control signal u that is input into the speakers 17 by identifying, in advance, the transmission characteristics (path characteristics) from the speakers 17 to the position where the evaluation microphone 18 is actually installed. Calculation of the signal of the control sound is performed in each of speaker signal subtractors 26 illustrated in FIG. 16. The speaker signal subtractors 26 are realized by, for example, various circuit elements such as a low-pass filter, high-pass filter, bandpass filter, etc., a combination thereof, or a digital filter by DSP and FPGA.

According to the present embodiment, the following can be said. The rotor-stator blade interference noise reduction system 11 includes: a plurality of rotor blades 14 rotating around a center axis 13; a plurality of stator blades 15 facing the plurality of rotor blades 14, and being equal in number to the plurality of rotor blades 14; two speakers 17 installed approximately along a rotor blade plane 23 defined by the plurality of rotor blades rotating 14, and generating control sound; a tubular duct 16 surrounding the plurality of rotor blades 14 and the plurality of stator blades 15; an evaluation microphone 18 attached to the duct 16 and acquiring noise generated from the plurality of rotor blades 14 and the control sound generated from the plurality of speakers 17; and a controller 21 performing control using a virtual microphone system to virtually locate the evaluation microphone 18 on a first virtual point 31 approximately along the rotor blade plane 23 or a second virtual point 32 on the center axis 13, in which if the first virtual point 31 is adopted, the first virtual point 31 is set so that a distance from the first virtual point 31 to one of the two speakers 17, a distance from the first virtual point 31 to the other of the two speakers 17, and a distance from the first virtual point 31 to the center axis 13, are equal, and if the second virtual point 32 is adopted, the second virtual point 32 is set so that a distance from the second virtual point 32 to the center axis 13 is approximately equal to a distance from the second virtual point 32 to one of the speakers 17, and is approximately equal to a distance from the second virtual point 32 to the other of the two speakers 17, the controller causing the two speakers 17 to generate the control sound having the same phase and the same amplitude.

According to this configuration, even if the position of the evaluation microphone 18 is excessively far from the rotor blades 14 due to the relation of installation angles of the speakers 17, etc., the evaluation microphone 18 can be attached to the duct 16 using the virtual microphone system. Thus, even in a case where the evaluation microphone 18 cannot be installed in a desired position obtained by calculation, the evaluation microphone 18 can be virtually installed at an ideal position using the virtual microphone system. This can address the installation location problem to efficiently reduce acoustic power by noise.

While certain embodiments have been described, these embodiments have been presented by way of example only, and are not intended to limit the scope of the embodiments. Indeed, the embodiments described herein may be embodied in a variety of other forms; furthermore, various omissions, substitutions and changes in the form of the embodiments described herein may be made without departing from the spirit of the invention. The above description has assumed that the rotor-stator blade interference noise reduction system 11 of the present embodiments is applied to an axial-flow fan or propeller of the flying object, but the axial-flow fan applied is not limited thereto. The rotor-stator blade interference noise reduction system 11 of the present embodiments are applicable to, for example, turbo fans, industrial fans (jet engines, etc.), fans used in moving objects other than the flying object, and other general fans. These embodiments and modifications thereof are included in the scope and spirit of the invention, and are similarly included in the inventions claimed in the patent claims and in the scope of equivalents of the inventions.

The invention claimed is:

1. A rotor-stator blade interference noise reduction system, comprising:
   a plurality of rotor blades rotating around a center axis;
   a plurality of stator blades facing the plurality of rotor blades, and being equal in number to the plurality of rotor blades;
   a plurality of speakers installed approximately along a rotor blade plane defined by the plurality of rotor blades rotating, and generating control sound; and
   an evaluation microphone,
   wherein a distance from the evaluation microphone to one of the plurality of speakers, a distance from the evaluation microphone to another of the plurality of speakers, and a distance from the evaluation microphone to the center axis, are approximately equal.

2. The system according to claim 1, wherein a number of the plurality of speakers is two.

3. The system according to claim 1, further comprising a controller for causing the plurality of speakers to generate the control sound having a same phase and a same amplitude.

4. The system according to claim 1, further comprising:
a tubular duct surrounding the plurality of rotor blades and the plurality of stator blades, and including at least one opening edge,
wherein the plurality of speakers and the evaluation microphone are provided along the opening edge.

5. The system according to claim 4, wherein
a distance from the center axis to each of the plurality of speakers is approximately equal to a length of one rotor blade included in the plurality of rotor blades or approximately equal to a radius of the dust,
an azimuth angle of the evaluation microphone is set between an azimuth angle of one of the plurality of speakers and an azimuth angle of another of the plurality of speakers, and
a deviation amount of an azimuth angle of each of the plurality of speakers with respect to the azimuth angle of the evaluation microphone is 70° or more and 80° or less.

6. The system according to claim 1, wherein
a distance from the center axis to each of the plurality of speakers is set at from 1.3 to 1.6 times a length of one rotor blade included in the plurality of rotor blades,
an azimuth angle of the evaluation microphone is set between an azimuth angle of one of the plurality of speakers and an azimuth angle of another of the plurality of speakers, and
a deviation amount of an azimuth angle of each of the plurality of speakers with respect to the azimuth angle of the evaluation microphone is approximately 60°.

7. The system according to claim 3, further comprising a plurality of second evaluation microphones acquiring noise generated from the plurality of rotor blades, and the control sound generated from the plurality of speakers,
wherein
the plurality of second microphones are arranged on a circumference around the center axis at a position approximately along the rotor blade plane, the circumference including a radius equal to a distance from the evaluation microphone to the center axis, and
the controller is configured to:
subtract, from a signal output from the evaluation microphone, a signal corresponding to the control sound from the plurality of speakers to obtain a first signal;
subtract, from signals output from the plurality of second evaluation microphones, the signal corresponding to the control sound from the plurality of speakers to obtain a plurality of second signals; and
sum the first signal and the plurality of second signals, and divide the summed signals by a total number of the evaluation microphone and the plurality of second evaluation microphones to obtain an average signal.

8. A flying object comprising the rotor-stator blade interference noise reduction system according to claim 1.

9. A rotor-stator blade interference noise reduction system, comprising:
a plurality of rotor blades rotating around a center axis;
a plurality of stator blades facing the plurality of rotor blades, and being equal in number to the plurality of rotor blades;
a plurality of speakers installed approximately along a rotor blade plane defined by the plurality of rotor blades rotating, and generating control sound; and
an evaluation microphone,
wherein
a distance from a point where the center axis intersects with the rotor blade plane to the evaluation microphone is approximately equal to a distance from the evaluation microphone to one of the plurality of speakers, and is approximately equal to a distance from the evaluation microphone to another of the plurality of speakers.

10. The system according to claim 9, wherein a number of the plurality of speakers is two.

11. The system according to claim 9, further comprising a controller for causing the plurality of speakers to generate the control sound having a same phase and a same amplitude.

12. The system according to claim 9, further comprising a tubular duct surrounding the plurality of rotor blades and the plurality of stator blades, and including at least one opening edge,
wherein the two speakers are provided along the opening edge.

13. A flying object comprising the rotor-stator blade interference noise reduction system according to claim 9.

14. A rotor-stator blade interference noise reduction system, comprising:
a plurality of rotor blades rotating around a center axis;
a plurality of stator blades facing the plurality of rotor blades, and being equal in number to the plurality of rotor blades;
a plurality of speakers installed approximately along a rotor blade plane defined by the plurality of rotor blades rotating, and generating control sound;
a tubular duct surrounding the plurality of rotor blades and the plurality of stator blades;
an evaluation microphone attached to the duct and acquiring noise generated from the plurality of rotor blades and the control sound generated from the plurality of speakers; and
a controller performing control using a virtual microphone system to virtually locate the evaluation microphone at a first virtual point approximately along the rotor blade plane or a second virtual point on the center axis,
wherein if the first virtual point is adopted, the first virtual point is set so that a distance from the first virtual point to one of the plurality of speakers, a distance from the first virtual point to another of the plurality of speakers, and a distance from the first virtual point to the center axis, are equal, and
if the second virtual point is adopted, the second virtual point is set so that a distance from a point where the center axis intersects with the rotor blade plane to the second virtual point is approximately equal to a distance from the second virtual point to one of the plurality of speakers, and is approximately equal to a distance from the second virtual point to another of the plurality of speakers,
the controller causing the plurality of speakers to generate the control sound having a same phase and a same amplitude.

15. The system according to claim 14, wherein a number of the plurality of speakers is two.

16. A flying object comprising the rotor-stator blade interference noise reduction system according to claim 14.

* * * * *